2,486,120

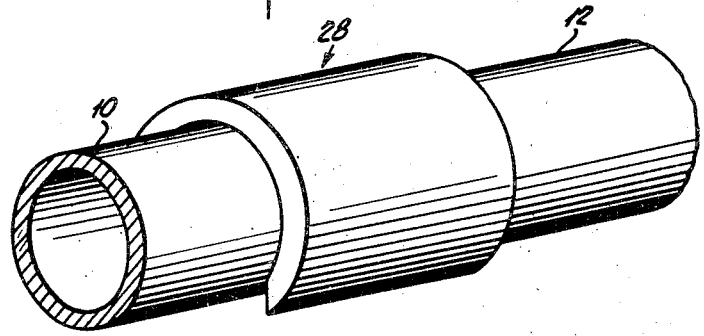
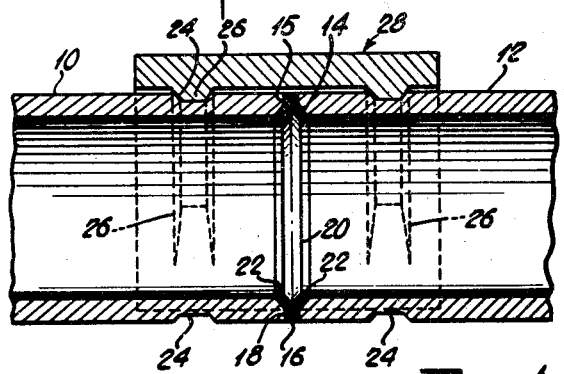
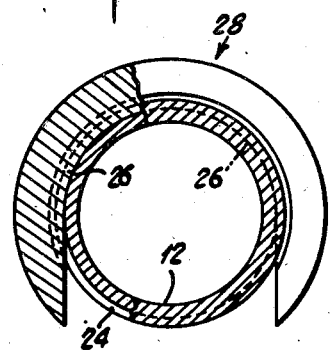
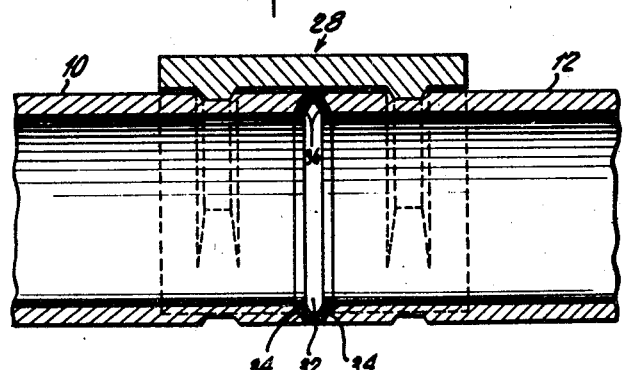
INVENTORS
RALPH L. BARBEHENN.
DUDLEY T. COLTON.
BY Virgil C. Kline
ATTORNEY Patented Oct. 25, 1949

UNITED STATES PATENT OFFICE 2,486,120

PIPE COUPLING ASSEMBLY

Dudley T. Colton, Martinsville, and Ralph L. Barbehenn, Plainfield, N. J., assignors to Johns-Manville Corporation, New York, N. Y., a corporation of New York Application August 31, 1945, Serial No. 613,880

3 Claims. (Cl. 285—143)

The instant invention relates to improved pipe couplings and, more particularly, to devices which, although suitable for coupling steel and iron pipe and the like, find a principal field of use in the assembly of pipe sections composed of a hardened, compressed, asbestos-cement composition.

The principal type of coupling now used for asbestos-cement pipe of the kind referred to consists of a sleeve surrounding the joint between endwise adjacent pipe sections, the sleeve having inwardly directed end flanges. Gasketing rings are confined within the sleeve at opposite sides of the joint to seal the same against the escape of fluid from within the pipe as fully shown and described in patent to Maza #1,947,998, issued February 20, 1934. This coupling has proved entirely satisfactory for most uses and has enjoyed a high degree of commercial success. However, care and the use of special apparatus is required to assemble the coupling, and it is not as easily disassembled as desired, particularly when the coupling is to be used on lines which must be frequently re-laid as, for example, in the case of irrigation lines which are to be shifted from one location to another after relatively short periods of use.

A principal object of the instant invention is the provision of a coupling which can be assembled and disassembled with greater ease and rapidity than those heretofore known, adapting it particularly for use in irrigating lines and in other situations where such features are of importance.

Another object of the invention is the provision of a pipe coupling assembly of the type referred to which provides a tight seal under ordinary operating pressures, say, under heads of 30 to 40 lbs. per square inch.

Another object of the invention is the provision of such pipe coupling which is completely non-metallic and can be assembled without tools or skilled labor. All parts of the assembly can be re-used after disassembly and are of such construction that minor chipping of the pipe ends, as is inevitable when the pipe is handled a number of times in the field, does not adversely affect the efficiency of the seal.

Briefly described, the invention resides in the provision of a coupling assembly for joining endwise adjacent pipe sections, the assembly including a gasket having inwardly extending diverging arms lying against inclined faces formed on the ends of the pipe sections whereby the gasket is maintained in sealing engagement by the internal fluid pressure component exerted axially of the pipe against the diverging arms and by the circumferential distortion of the gasket. The coupling also includes means that can be readily mounted and dismounted for preventing endwise separation of the pipe sections under the influence of such pressure. In the preferred embodiment a substantially U-shaped coupling sleeve is used, the sleeve including means such as beads or flanges for interlocking engagement with cooperating means such as grooves on the pipe sections at opposite sides of the joint.

Our invention will be more fully understood and further objects and advantages thereof will become apparent when reference is made to the more detailed description of a preferred embodiment thereof which is to follow and to the accompanying drawings, in which:

Fig. 1 is a perspective view of a pipe coupling assembly in accordance with the instant invention;

Fig. 2 is a sectional view taken longitudinally through the assembly of Fig. 1;

Fig. 3 is an end view of the assembly of Fig. 1 with parts broken away and parts in section for clearness of illustration; and Fig. 4 is a view similar to Fig. 2 disclosing a modification.

Referring now to the drawings, and, more particularly, to Figs. 1 to 3 inclusive, there are shown pipe sections 10 and 12 which may be composed of asbestos-cement, cast iron, steel or other suitable materials. As previously pointed out, however, the invention is particularly directed to the coupling of asbestos-cement pipe. In the fabrication process, the asbestos-cement composition is highly compressed and densified, with the result that the pipe is hard and relatively inflexible and presents coupling problems not encountered with pipe of other types.

Pipe sections 10 and 12 are provided with end faces machined as shown to provide chamfer 14 extending at an obtuse angle to the inner wall of the pipe section. In the preferred embodiment shown in Figs. 2 and 3, the chamfer extends from the inner wall to a point intermediate the inner and outer walls, leaving a vertical face 15. In the assembled coupling the pipe sections are arranged in substantial axial alignment and are spaced apart sufficiently to leave a gap 16 between faces 15 of a width to receive the leg 18 of a gasket 20. The gasket, which has a cross-section of Y configuration, is provided with diverging arms 22 of a combined thickness, preferably somewhat greater than the thickness of the leg 18, the arms defining an open space therebetween. Arms 22 lie against the chamfered faces 14 of the opposite pipe sections.

Circumferential grooves 24 are provided adjacent the ends of the pipe sections for cooperation with ribs 26 carried by a coupling member 28. The spacing of the grooves relative to the ends of the pipes is such that when the pipes are in end to end relationship with the center to center spacing of the grooves equal to the center to center spacing of ribs 26 on the coupling member, the ends of the pipes will be spaced apart just enough to snugly receive the leg 18 of gasket 20, and preferably to maintain leg 18 under slight compression.

The coupling member which serves to retain the pipe sections against endwise separation and in embracing relationship to gasket 20 comprises a section of pipe of larger diameter than pipes 10 and 12 and having the internal projections or ribs 26. Preferably member 24 is composed of the same material employed for the pipe sections, namely, a hardened, compressed, asbestos-cement material. The inner diameter of member 28 is somewhat greater than the outer diameter of the pipe sections, as shown. For example, the coupling member may have an inner diameter of approximately 4⅞" when used on pipe having an outer diameter of approximately 4¾". Ribs 26 are of a depth and cross-section to fit easily but without substantial play in grooves 24.

Coupling member 28 is cut away on parallel planes tangent to the inner faces of ribs 26 to define a substantially U-shaped structure adapted to be slipped downwardly over the joint with ribs 26 sliding into grooves 24. Due to the greater inner diameter of the coupling member as compared to the outer diameter of the pipe sections, the coupling member embraces an arcuate area of the pipe sections substantially greater than 180°, as is clearly shown in Figs. 1 and 3.

In assembling a pipe coupling of the instant invention, pipe sections 10 and 12 are brought into substantially axial alignment and gasket 20 inserted between the opposed ends of the pipe sections. One or both of the pipe sections are then moved axially to firmly grasp the gasket between them and confine it in the position shown in Fig. 2. Coupling member 28 is then placed over the joint with its open side adjacent the pipe and pressed into coupling position with ribs 26 sliding into grooves 24. As will be readily understood, the coupling may be as easily disassembled by lifting off the coupling member and moving the pipe sections axially away from each other.

The pipe coupling described above may be very quickly assembled and disassembled without the use of tools or special skill. Minor chipping of the pipe ends will not adversely affect the joint and the parts may be re-used many times. In operation, the arms of the gasket are forced into sealing engagement with the pipe and the coupling member is locked in position against accidental withdrawal by the axial thrust of the internal fluid pressure. The gasket provides a tight joint under usual operating pressures, say, pressures in the range of 30 to 40 lbs. per sq. in., without danger of blowing out. When the internal pressure is released, disassembly of the coupling is readily permitted.

The Y-shaped gasket 20, shown particularly in Fig. 2 and described above, may be replaced by gaskets of other forms. Referring to Fig. 4, an assembly is shown employing a substantially U-shaped gasket 32 cooperating with chamfered faces 34 extending the full thickness of the pipe walls. The arms 36 of the gasket preferably have a combined thickness somewhat greater than the width of the gap between the pipe ends. The sealing action obtained is of the same character as that described above, the fluid pressure within the pipe forcing arms 36 of gasket 32 against the chamfered faces 34, separation of the pipes being prevented by the coupling sleeve.

Having thus described our invention in rather full detail, it will be understood that these details need not be strictly adhered to and that various changes and modifications will suggest themselves to one skilled in the art, all falling within the scope of the invention as defined by the subjoined claims.

What we claim is:

1. A pipe coupling assembly comprising pipe sections having opposed, spaced end faces with chamfers extending to the inner wall thereof, said faces defining a joint therebetween, a packing member within said joint and separating said pipe sections, said packing member having arms lying against said chamfers and defining a central channel in communication with the interior of the pipe sections whereby said arms are pressed into sealing engagement with said chamfers by axially applied fluid pressure within said pipe sections, a detachable C-shaped coupling member partially surrounding said joint, and interengaging means on said pipe sections and coupling member to releasably interlock said pipe sections against endwise separation under the axially applied fluid pressure.

2. A pipe coupling assembly comprising pipe sections having opposed, spaced end faces with inner chamfers, said faces defining a joint therebetween, a packing member within said joint and separating said pipe sections, said packing member being of generally Y-shape in cross-section with the arms of the Y lying against said chamfers whereby they are pressed into sealing engagement therewith by axially applied fluid pressure within said pipe sections, a detachable C-shaped coupling member partially surrounding said joint, and interengaging means on said pipe sections and coupling member to releasably interlock said pipe sections against endwise separation under the axially applied fluid pressure.

3. A pipe coupling assembly comprising pipe sections having opposed, spaced end faces extending at acute angles to the outer surfaces of the respective pipe sections and defining a joint therebetween, a packing member within said joint and separating said pipe sections, said packing member being of substantially U-shape in cross-section with the legs of the U lying against said faces whereby said legs are pressed into sealing engagement with said faces by axially applied fluid pressure within said pipe sections, a C-shaped coupling member partially surrounding said joint, and interengaging means on said pipe sections and coupling member to releasably interlock said pipe sections against endwise separation under the axially applied fluid pressure.

DUDLEY T. COLTON.
RALPH L. BARBEHENN.

REFERENCES CITED

The following references are of record in the file of this patent:

UNITED STATES PATENTS

| Number | Name | Date |
|---|---|---|
| 1,221,707 | Durbin | Apr. 3, 1917 |
| 1,887,332 | Shrum | Nov. 8, 1932 |
| 2,081,040 | King | May 18, 1937 |

FOREIGN PATENTS

| Number | Country | Date |
|---|---|---|
| 462,447 | France | Jan. 27, 1914 |